United States Patent
Schlitt

[15] 3,707,258
[45] Dec. 26, 1972

[54] SOLDERING GUN FOR ONE-HANDED MANIPULATION

[72] Inventor: Klaus Schlitt, 2, Voltenseestrasse, 6 Bergen-Enkheim near Frankfurt/Main, Germany

[22] Filed: May 13, 1969

[21] Appl. No.: 824,209

[30] Foreign Application Priority Data

Mar. 26, 1969 Germany............... P 19 15 259.1

[52] U.S. Cl. .....................228/52, 219/229, 228/41
[51] Int. Cl. ...............................................B23k 3/06
[58] Field of Search .......228/51, 52, 53, 41; 219/229

[56] References Cited

UNITED STATES PATENTS

| | | | |
|---|---|---|---|
| 3,521,804 | 7/1970 | Jacobs | 228/52 |
| 3,377,012 | 4/1968 | Cushman | 228/53 X |
| 3,181,763 | 5/1965 | Koga | 228/53 |
| 3,171,374 | 3/1965 | Frenzel | 228/53 |
| 3,112,722 | 12/1963 | Ando | 228/53 |
| 2,758,192 | 8/1956 | Gustafsson | 228/53 |
| 2,432,428 | 12/1947 | Lang | 228/52 |

*Primary Examiner*—John F. Campbell
*Assistant Examiner*—R. J. Craig
*Attorney*—Markva & Smith

[57] ABSTRACT

A soldering gun, and more particularly a soldering gun for one-handed manipulation is provided containing a supply bobbin for soldering wire and means for feeding the latter. Said soldering gun consists of two functional assemblies resiliently coupled as required by the state and properties of the soldering wire by means of a compression spring being placed between said cooperating assemblies. The soldering wire advances through the axial bore of a fine steel barrel which contains insulating lining members as well as a heating cartridge, the advance of the wire being controlled by a locking wheel located in a stationary part of the soldering gun. Thus a thrust is generated that does not exceed the buckling strength of the heated wire.

17 Claims, 1 Drawing Figure

PATENTED DEC 26 1972　　3,707,258
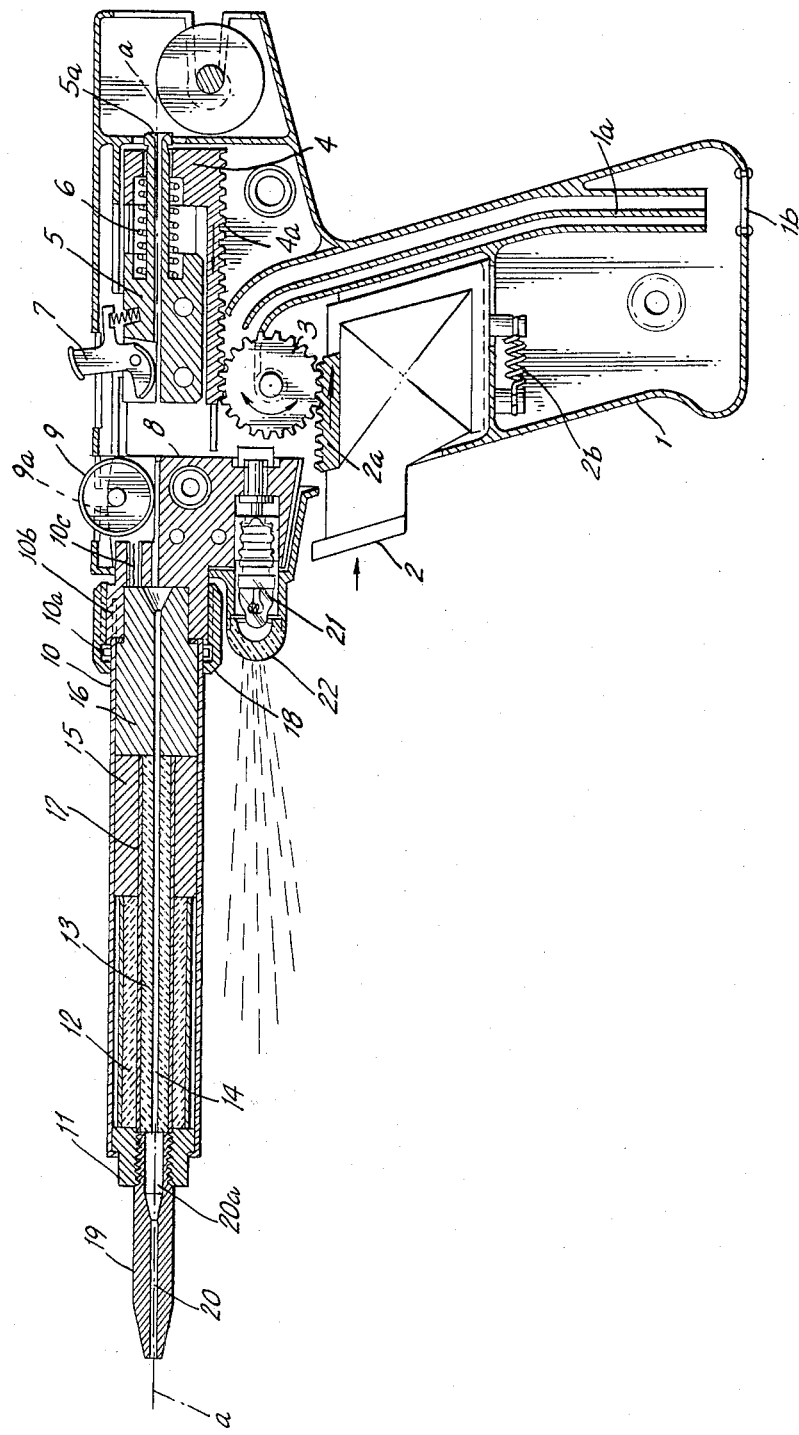

SOLDERING GUN FOR ONE-HANDED MANIPULATION

BACKGROUND OF THE INVENTION

This invention relates to soldering guns, and more specifically to a soldering gun for one-handed manipulation with a supply bobbin for soldering wire and means for feeding said wire.

In a conventional type of soldering gun a soldering wire provided with a flux as a core is advanced by feed means into an electrically heated soldering bit. The feed means are constituted by serrated or smooth pressure and feed rollers, ratchet and pawl devices and similar gripping elements which squeeze and deform the soldering wire. None of these feed means is capable of preventing the soft soldering wire from being bent, buckled or deformed into undular shape as soon as the wire meets resistance in the heating and/or soldering zone.

Other appliances known in the art comprise a soldering tool proper to which a feed mechanism for the soldering wire is detachably or permanently affixed. In these arrangements the relatively cold soldering wire does not enter the heat bit until it has substantially already reached the soldering zone where it is desired to melt. In this method of soldering the solder has a tendency of dripping and consequently these appliances are only of limited use for soldering components of small geometrical size, for instance in telecommunications equipment and the like, where a precise application of the solder is necessary.

SUMMARY OF THE INVENTION

It is therefore the object of the present invention to provide for the solder to be delivered to a soldering bit in a manner that is thermally accurately regulated and controllable with the aid of a soldering gun that can be handled with one hand.

This object cannot be attained unless arrangements are made for feeding the soldering wire through a heating zone the invention proposes to provide into a soldering bit without the wire being buckled, bent or compressed and unless the feed means are so designed that the correct quantity of solder is supplied to the component that is to be soldered. Moreover, it is desirable that the soldering wire should be capable of being withdrawn and pulled taut whenever this may be required. For this purpose the conventional feed means for the soldering wire as well as the means that have been used for guiding the same into and through a heating zone must be modified.

To attain this object the present invention provides a soldering gun of the type described having feed means which comprise two functionally cooperating assemblies which are resiliently coupled with due regard to the state and properties of the soldering wire by a compression spring generating a thrust that does not exceed the buckling strength of the soldering wire and thereby avoids buckling or bending said wire whilst it is in course of being heated.

BRIEF DESCRIPTION OF THE DRAWING

A preferred embodiment of the invention will now be described by way of example and with reference to the accompanying drawing in which the FIGURE is a longitudinal section of a soldering gun according to the invention.

DESCRIPTION OF THE PREFERRED EMBODIMENT

The drawing shows a soldering gun that comprises a pistol grip 1 made of an impact-resistant light-weight plastics material with an opening 1b at the bottom and a conduit 1a for the entry therethrough of an electric cable. The reference numeral 2 denotes a finger-operated push-type actuating member which can be pushed into the grip 1 against the resistance of a compression spring 2b, and which carries a rack 2a meshing with a gearwheel 3. The latter is in mesh with a second rack 4a affixed to the first slide 4 of a compound slide 4,5. A soldering wire which is introduced into a longitudinal bore 5a in the second slide 5 is gripped by a spring-loaded manually retractable clamping shoe 7 mounted on the second slide 5, and is advanced by the forward motion of the compound slide 4,5 underneath a spring-loaded locking wheel 9 which is located in a stationary part 8 of the soldering gun, retains the wire and permits the clamping shoe 7 to slide back over the wire when the compound slide 4,5 returns to its rearward position. The entire feeding mechanism proposed by the invention functionally comprises two assemblies which may also be operated electrically and are resiliently coupled with due regard to the state and the properties of the soldering wire by an interposed compression spring 6, the thrust of said spring being so chosen that its thrust does not exceed the buckling strength of the soldering wire. The locking wheel 9 is loaded by a leaf spring 9a but can be easily lifted in a vertical elongated slot to allow the soldering wire to be withdrawn or pulled taut. The reference numeral 10 denotes a fine steel barrel which is provided with an annular collar 10a detachably connected mechanically by a ring nut 18 and electrically by contacts 10b and 10c to the stationary part 8 of the soldering gun. The fine steel barrel 10 houses a first and a second insulating, preferably ceramic, axially bored lining member 15 and 16 as well as a preferably replaceable heating cartridge 12 which consists of a ceramic tube provided with a heating coil, and an internal fine steel tube 17 containing a ceramic lining 13 provided with an axial bore 14. Tests have shown that a soldering wire which is gradually softening will still satisfactorily slide in such a ceramic tube and that no residues of solder will adhere to the tube. The front end of the fine steel barrel 10 is closed by a threaded copper plug 11 into which a soldering bit 19 having an axial bore 20 can be detachably fitted. The reference numeral 20a denotes a conically flared entry section of the bit 19 which permits the soldering wire to enter said bit easily. Also the entry end of the axial bore in the second insulating member at the breech end of the barrel is preferably conically flared. Above the actuating member 2 is a light bulb 21 with a cap 22 which projects a beam of light forward for illumination. a—a is the straight longitudinal channel through which the soldering wire is fed.

Operation of the soldering gun will now be described. The soldering wire from the supply bobbin is threaded through bore 5a in the second slide 5, beneath clamping shoe 7 beneath locking wheel 9 and through the axial bore 14 in barrel 10 including lining members 15 and 16 and ceramic lining 13 to the soldering bit 19. The soldering wire is softened in the heating cartridge 12 of barrel 10.

Upon pressing the actuating member 2, the rack 2a is moved rearwardly causing gear wheel 3 to rotate in a counterclockwise direction as viewed in the FIGURE causing the first slide 4 including rack 4a to be moved forwardly. At the same time the second slide 5 mounted on the first slide 4 and including the clamping shoe 7 is caused to move forwardly, the clamping shoe serving to grip the soldering wire therebeneath and causing an incremental forward movement of the soldering wire. The forward movement of the soldering wire overcomes the frictional resistance at the point where locking wheel 9 presses the soldering wire against the stationary part 8, and the locking wheel 9 is caused to rotate during this forward movement of the soldering wire. With the forward movement of the soldering wire, the portion which has been softened by heating cartridge 12 is moved forwardly into the soldering bit 19 and a fresh section of the soldering wire enters the heating cartridge 12 where it is heated and softened.

Release of the actuating member 2 causes the actuating member to move in the opposite direction to the left as viewed in the FIGURE under the influence of compression spring 2b. This consequently causes the first and second slides 4 and 5 to move rearwardly. Since the locking wheel 9 causes the soldering wire to frictionally engage the stationary part 8 and remain stationary, the clamping shoe 7 is caused to slide along the surface of the stationary soldering wire as the second slide 5 moves rearwardly.

Upon again pressing actuating member 2, the clamping shoe 7 is caused to again grip the soldering wire as the second slide 5 is moved forwardly to carry forward the soldering wire by a further increment.

To avoid the possibility of excessive pressure upon the actuating member 2 causing the forward movement of the second slide 5 to exceed the buckling strength of the soldering wire, the compression spring 6 interposed between the first and second slides 4 and 5 provides a forward thrust which does not exceed the buckling strength of the soldering wire. Thus, in the event that the forward pressure of the second slide 5 on the soldering wire through clamping shoe 7 should reach the buckling strength of the soldering wire, the second slide 5 is caused to remain stationary as the compression spring 6 is compressed by the continued forward movement of the first slide 4. Buckling of the soldering wire is thereby prevented. The possibility of the operation of the soldering gun being jammed by bending of the section of the soldering wire between the clamping shoe 7 and the stationary part 8 is completely eliminated.

What is claimed is:

1. A soldering gun for one-handed manipulation with a supply bobbin for soldering wire and means for feeding said wire, said feed means comprising two functionally cooperating assemblies which are resiliently coupled with due regard to the state and properties of the soldering wire by a compression spring generating a thrust that does not exceed the buckling strength of the soldering wire and thereby avoids buckling or bending said wire while it is in course of being heated, one of said two functionally cooperating assemblies of the feed means comprising a spring-loaded finger-operated push-type actuating member provided with a rack meshing with a gear wheel in mesh with a rack on a movable slide which through said interposed compression spring displaces the other functional assembly consisting of a second slide with a longitudinal bore for the reception of the soldering wire from the supply bobbin.

2. A soldering gun according to claim 1, comprising a spring-loaded manually retractable clamping shoe mounted on the second slide and adapted to grip the soldering wire by bearing down on the same during the forward movement of the second slide, whereas during the return of the second slide the wire is retained by a spring-loaded locking wheel thereby permitting the clamping shoe to slide back on the wire during said return movement.

3. A soldering gun according to claim 2, wherein the spring-loading locking wheel is located in a stationary part of the gun and presses the wire against the wall of a longitudinal bore in said stationary part through which the wire advances, said locking wheel being mounted in a vertical elongated slot to permit release of the wire when desired.

4. A soldering gun according to claim 1, comprising a fine steel barrel formed with a collar and accommodating a heating cartridge as well as a first and a second insulating lining member having each an axial bore, the front end of said barrel being closed by a threaded plug into which a soldering bit having also an axial bore is detachably fitted.

5. A soldering gun according to claim 4, wherein the heating cartridge is replaceably arranged and comprises a ceramic tube provided with a heating coil and an internal fine steel tube provided on its inside with a lining having an axial bore.

6. A soldering gun according to claim 4, wherein the fine steel barrel is mechanically and electrically detachably connected to a stationary part in the gun by means of a ring nut and electrical contact elements.

7. A soldering gun according to claim 4, wherein the entry end of the axial bore in the second insulating member at the breech end of the barrel and the entry end of the axial bore through the soldering bit are conically flared.

8. A soldering gun according to claim 1, comprising a light source above the actuating member.

9. A soldering gun for one-handed manipulation comprising
 a. an elongated member having a bore therein,
 b. a feed member mounted for oscillatory movement to feed a length of soldering wire through said bore in incremental steps,
 c. releasable clamping means mounted on said feed member, and comprising a pivotably mounted shoe for pressing said wire against said feed member to permit application of feed pressure in said forward direction to said wire during feed strokes by said feed member and for releasing the pressure on said wire permitting said wire to remain stationary during return strokes in a rearward direction by said feed member, and
 d. means mounted on a stationary part of said gun for frictionally engaging said wire to restrain said wire against movement through said bore during return strokes by said feed member.

10. A soldering gun according to claim 9 wherein said feed member includes a bore through which said wire passes.

11. A soldering gun for one-handed manipulation comprising
   a. an elongated member having a bore therein,
   b. a feed member mounted for oscillatory movement to feed a length of soldering wire through said bore in incremental steps,
   c. said feed member comprising a first side member mounted for oscillatory movement, a second slide member mounted for movement on said first slide member in the same direction as said first slide member, releasable clamping means mounted on said second slide member for clamping said wire during feed strokes in a forward direction by said feed member and releasing said wire during return strokes in a rearward direction by said feed member, and biasing means for pressing said second slide member in said forward direction and being adapted to permit said second slide member to remain stationary during forward movement of said first slide member in the event the forward pressure on said wire during said feed stroke exceeds a predetermined amount whereby buckling or bending of said wire is avoided.

12. A soldering gun according to claim 11 wherein said biasing means comprises a compression spring extending between said first and second slide members.

13. A soldering gun for one-handed manipulation comprising
   a. a barrel comprising heating means for softening soldering wire,
   b. a feed member mounted for oscillatory movement to feed a length of said soldering wire through said barrel in incremental steps,
   c. releasable means mounted on said feed member for clamping said wire during feed strokes in a forward direction by said feed member and releasing said wire during return strokes in a rearward direction by said feed member, and
   d. means mounted on a stationary part of said gun for frictionally engaging said wire to restrain said wire against movement through said bore during return strokes by said feed member.

14. A soldering gun according to claim 13 wherein said barrel comprises insulating means positioned between said heating means and the end of said barrel adjacent said feed member.

15. In a soldering gun comprising means for feeding a continuous length of soldering wire, said feeding means comprising
   a. means for releasably gripping a soldering wire,
   b. actuating means for moving said gripping means in a forward direction an incremental distance along a path while gripping said wire and for returning said gripping means along said path while said wire is released, and
   c. biasing means between said actuating and gripping means adapted to bias said gripping means in said forward direction relative to said actuating means by an amount not exceeding the buckling strength of the soldering wire,
   d. whereby when the force required to move said soldering wire exceeds its buckling strength said biasing means will absorb the force of said actuating means as said actuating means is moved allowing said gripping means to remain stationary to prevent buckling of said wire while maintaining pressure on said wire to feed it in a forward direction.

16. A soldering gun for one-handed manipulation comprising
   a. an elongated member having a bore therein,
   b. a feed member mounted for oscillatory movement to feed a length of soldering wire through said bore in incremental steps,
   c. releasable means mounted on said feed member for clamping said wire during feed strokes in a forward direction by said feed member and releasing said wire during return strokes in a rearward direction by said feed member, and
   d. means mounted on a stationary part of said gun for frictionally engaging said wire to restrain said wire against movement through said bore during return strokes by said feed member, said means for frictionally engaging said wire comprising a support surface for said wire, a wheel and means biasing said wheel to press the cylindrical surface thereof against said wire whereby said wire is frictionally engaged between said wheel and said support surface to permit said wire to be fed forwardly therebetween but prevent movement of said wire during said return stroke.

17. A soldering gun for one-handed manipulation comprising
   a. an elongated member having a bore therein,
   b. a feed member mounted for oscillatory movement to feed a length of soldering wire through said bore in incremental steps,
   c. releasable means mounted on said feed member for clamping said wire during feed strokes in a forward direction by said feed member and releasing said wire during return strokes in a rearward direction by said feed member,
   d. means mounted on a stationary part of said gun for frictionally engaging said wire to restrain said wire against movement through said bore during return strokes by said feed member, and
   e. a spring-biased actuating member and rack and pinion means responsive to movement of said actuating member for moving said feed member.

* * * * *